United States Patent [19]

Shinoaki et al.

[11] Patent Number: 5,592,397
[45] Date of Patent: Jan. 7, 1997

[54] COMPUTER PROGRAM PRODUCT FOR DETERMINING ELEMENTARY CIRCUITS AND INITIAL VALUES OF FLOW IN A PIPE NETWORK

[75] Inventors: Sakura Shinoaki, Fujisawa; Junichi Enomoto, Funabashi, both of Japan

[73] Assignee: Tokyo Gas Co., Ltd., Tokyo, Japan

[21] Appl. No.: 399,366

[22] Filed: Mar. 6, 1995

Related U.S. Application Data

[62] Division of Ser. No. 59,291, May 11, 1993, Pat. No. 5,414,641.

[51] Int. Cl.$^6$ ........................................ G06F 17/00
[52] U.S. Cl. ........................................ 364/510; 364/578
[58] Field of Search ........................................ 364/505, 510, 364/509, 512, 578, 550

[56] References Cited

U.S. PATENT DOCUMENTS

| | | | |
|---|---|---|---|
| 3,599,233 | 8/1971 | Meyer | 235/151 |
| 4,559,610 | 12/1985 | Sparks et al. | 364/803 |
| 4,569,012 | 2/1986 | Sekozawa et al. | 364/164 |
| 4,573,114 | 2/1986 | Ferguson et al. | 364/138 |
| 4,613,952 | 9/1986 | McClanahan | 364/578 |
| 4,628,462 | 12/1986 | Putman | 364/494 |
| 4,831,546 | 5/1989 | Mitsuta et al. | 364/550 |
| 5,062,068 | 10/1991 | Kondo et al. | 364/578 |

FOREIGN PATENT DOCUMENTS

| | | |
|---|---|---|
| 90102318 | 6/1990 | European Pat. Off. |

OTHER PUBLICATIONS

Wynne, R. J. et al., "The Implication of Model Order Reduction for Control System Design," Proceedings of the 27th IEEE Conference on Decision and Control, vol. 2, Dec. 1988, Austin, TX, pp. 1137–1142.

Lo, K. L., "Optimisation and Analysis of Gas Supply Networks," Transactions of the Institute of Measurement and Control, vol. 6, No. 5, Oct. 1984, London, England, pp. 253–260.

Karsai, G. et al., "Intelligent Supervisory Controller for Gas Distribution System," Proceedings of the 1987 American Control Conference, vol. 2, Jun. 1987, Minneapolis, MN, pp. 1353–1358.

Database SPI, Week 8404, Derwent Publications Ltd., London, England, AN 84–023298 & SU–A–1 007 1111 (UKR Power Simul), Abstract only.

*Primary Examiner*—Ellis B. Ramirez
*Assistant Examiner*—Edward Pipala
*Attorney, Agent, or Firm*—Sterne, Kessler, Goldstein & Fox P.L.L.C.

[57] ABSTRACT

A computer program product determines elementary circuits and initial values of flows in a pipe network including one or more source nodes and a plurality of demanding nodes. An upstream node and a downstream node of each pipe is determined. The upstream node has less total resistance than the downstream node to the source nodes. A pipe joined between an upstream node and a downstream node is selected as an upstream pipe of the downstream node. A pipe which is never designated as an upstream pipe is selected as a circuit origin pipe. A node level, which indicates the number of nodes included in the passage from the source node, is determined. An elementary circuit is determined, by tracing upstream nodes along a first route starting from a first node of the circuit origin pipe and along a second route starting from a second node of the circuit origin pipe in accordance with the node level of the upstream node of each pipe, until the first and second routes reach a same source node or a same demanding node. Each elementary circuit is used for setting initial values of flows of pipes, and then for computing the flows.

3 Claims, 17 Drawing Sheets

ELEMENTARY CIRCUIT C(1)

| NODE NO. i | UPSTREAM PIPE NO. UPIPE(i) | TOTAL RESISTANCE SD(i) | NODE LEVEL LEVEL(i) |
|---|---|---|---|
| 1 | — | 0.0 | — |
| 2 | 1 | 100 → 10 | — |
| 3 | 2 → 3 | 100 → 21 → 12 | — |
| 4 | — | 0.0 | — |
| 5 | 4 | 100 → 20 | — |
| 6 | 7 | 100 → 35 | — |
| 7 | 5 → 9 | 100 → 36 → 13 | — |
| 8 | 6 | 100 → 5 | — |
| 9 | 12 | 100 → 8 | — |
| 10 | 10 → 11 | 100 → 55 → 14 | — |

| PIPE NO. j | PIPE RESISTANCE RES(j) | UPSTREAM NODE UNODE(j) | DOWNSTREAM NODE DNODE(j) |
|---|---|---|---|
| 1 | 10 | 1 | 2 |
| 2 | 11 | 2 | 3 |
| 3 | 12 | 3 → 4 | 4 → 3 |
| 4 | 20 | 1 | 5 |
| 5 | 15 | 3 | 7 |
| 6 | 5 | 4 | 8 |
| 7 | 15 | 5 | 6 |
| 8 | 10 | 6 | 7 |
| 9 | 8 | 7 → 8 | 8 → 7 |
| 10 | 20 | 6 | 10 |
| 11 | 9 | 10 → 8 | 8 → 10 |
| 12 | 8 | 1 | 9 |
| 13 | 7 | 9 | 2 |

| NODE NO. i | UPSTREAM PIPE NO. UPIPE(i) | TOTAL RESISTANCE SD(i) | NODE LEVEL LEVEL(i) |
|---|---|---|---|
| 1 |  | 0.0 | — |
| 2 | 1 | 10 | — |
| 3 | 3 | 12 | — |
| 4 |  | 0.0 | — |
| 5 | 4 | 20 | — |
| 6 | 7 → 8 | 35 → 23 | — |
| 7 | 9 | 13 | — |
| 8 | 6 | 5 | — |
| 9 | 12 | 8 | — |
| 10 | 11 | 14 | — |

| PIPE NO. j | PIPE RESISTANCE RES(j) | UPSTREAM NODE UNODE(j) | DOWNSTREAM NODE DNODE(j) |
|---|---|---|---|
| 1 | 10 | 1 | 2 |
| 2 | 11 | 2 | 3 |
| 3 | 12 | 4 | 3 |
| 4 | 20 | 1 | 5 |
| 5 | 15 | 3 | 7 |
| 6 | 5 | 4 | 8 |
| 7 | 15 | 5 | 6 |
| 8 | 10 | 6 → 7 | 7 → 6 |
| 9 | 8 | 8 | 7 |
| 10 | 20 | 6 → 10 | 10 → 6 |
| 11 | 9 | 8 | 10 |
| 12 | 8 | 1 | 9 |
| 13 | 7 | 9 | 2 |

| NODE NO. i | UPSTREAM PIPE NO. UPIPE(i) | TOTAL RESISTANCE SD(i) | NODE LEVEL LEVEL(i) |
|---|---|---|---|
| 1 | — | 0.0 | — |
| 2 | 1 | 10 | 99 |
| 3 | 3 | 12 | 99 |
| 4 | — | 0.0 | — |
| 5 | 4 | 20 | 99 |
| 6 | 8 | 23 | 99 |
| 7 | 9 | 13 | 99 |
| 8 | 6 | 5 | 99 |
| 9 | 12 | 8 | 99 |
| 10 | 11 | 14 | 99 |

FIG. 14B

| PIPE NO. j | PIPE RESISTANCE RES(j) | UPSTREAM NODE UNODE(j) | DOWNSTREAM NODE DNODE(j) |
|---|---|---|---|
| 1 | 10 → -10 | 1 | 2 |
| 2 | 11 | 2 | 3 |
| 3 | 12 → -12 | 4 | 3 |
| 4 | 20 → -20 | 1 | 5 |
| 5 | 15 | 3 | 7 |
| 6 | 5 → -5 | 4 | 8 |
| 7 | 15 | 5 | 6 |
| 8 | 10 → -10 | 7 | 6 |
| 9 | 20 | 8 | 7 |
| 10 | 9 → -9 | 10 | 6 |
| 11 | 8 → -8 | 8 | 10 |
| 12 | 8 | 1 | 9 |
| 13 | 7 | 9 | 2 |

FIG. 14C

| CIRCUIT NUMBER k | CIRCUIT ORIGIN PIPE COP(k) |
|---|---|
| 1 | 2 |
| 2 | 5 |
| 3 | 7 |
| 4 | 10 |
| 5 | 13 |

FIG. 16A

| NODE NO. i | UPSTREAM PIPE NO. UPIPE(i) | TOTAL RESISTANCE SD(i) | NODE LEVEL LEVEL(i) |
|---|---|---|---|
| 1 | — | 0.0 | — |
| 2 | 1 | 10 | 99→2 |
| 3 | 3 | 12 | 99→2 |
| 4 | — | 0.0 | — |
| 5 | 4 | 20 | 99→2 |
| 6 | 8 | 23 | 99 |
| 7 | 9 | 13 | 99→3 |
| 8 | 6 | 5 | 99→2 |
| 9 | 12 | 8 | 99→2 |
| 10 | 11 | 14 | 99→3 |

FIG. 16B

| NODE NO. j | PIPE RESISTANCE RES(j) | UPSTREAM NODE UNODE(j) | DOWNSTREAM NODE DNODE(j) |
|---|---|---|---|
| 1 | −10→−10 | 1 | 2 |
| 2 | 11 | 2 | 3 |
| 3 | −12→−12 | 4 | 3 |
| 4 | −20→−20 | 1 | 5 |
| 5 | 15 | 3 | 7 |
| 6 | −5→−5 | 4 | 8 |
| 7 | 15 | 5 | 6 |
| 8 | −10 | 7 | 6 |
| 9 | −8→−8 | 8 | 7 |
| 10 | 20 | 10 | 6 |
| 11 | −9→−9 | 8 | 10 |
| 12 | −8→−8 | 1 | 9 |
| 13 | 7 | 9 | 2 |

FIG. 17A

| NODE NO. i | UPSTREAM PIPE NO. UPIPE(i) | TOTAL RESISTANCE SD(i) | NODE LEVEL LEVEL(i) |
|---|---|---|---|
| 1 |  | 0.0 | 1 |
| 2 | 1 | 10 | 2 |
| 3 | 3 | 12 | 2 |
| 4 |  | 0.0 | 1 |
| 5 | 4 | 20 | 2 |
| 6 | 8 | 23 | 99→4 |
| 7 | 9 | 13 | 3 |
| 8 | 6 | 5 | 2 |
| 9 | 12 | 8 | 2 |
| 10 | 11 | 14 | 3 |

| NODE NO. j | PIPE RESISTANCE RES(j) | UPSTREAM NODE UNODE(j) | DOWNSTREAM NODE DNODE(j) |
|---|---|---|---|
| 1 | 10 | 1 | 2 |
| 2 | 11 | 2 | 3 |
| 3 | 12 | 4 | 3 |
| 4 | 20 | 1 | 5 |
| 5 | 15 | 3 | 7 |
| 6 | 5 | 4 | 8 |
| 7 | 15 | 5 | 6 |
| 8 | −10→10 | 7 | 6 |
| 9 | 8 | 8 | 7 |
| 10 | 20 | 10 | 6 |
| 11 | 9 | 8 | 10 |
| 12 | 8 | 1 | 9 |
| 13 | 7 | 9 | 2 |

111 — 112 — 113 — 114 — 110

COMPUTER PROGRAM PRODUCT FOR DETERMINING ELEMENTARY CIRCUITS AND INITIAL VALUES OF FLOW IN A PIPE NETWORK

This spplication is a Divisional, of application Ser. No. 08/059,291, filed May 11, 1993, now U.S. Pat. No. 5,414,641.

BACKGROUND OF THE INVENTION

1. Field of the Invention

The present invention relates to a method and apparatus for determining elementary circuits and initial values of flows in a pipe network before applying the Hardy Cross method or the like to the pipe network to compute the flow of each pipe.

2. Description of the Related Art

Computation of flows in a network of pipes has been performed in such cases as new pipes are installed or stable supply are considered in water or gas networks. Similar computation has also been carried out in electric distribution networks.

A method for such computation using the Hardy Cross method is described, for example, on pages 427–438 in "Fluid Mechanics", V. L. Streeter, et al., McGraw-Hill Book Co., 1985. In this method, an engineer must divide a pipeline network into a plurality of elementary circuits, and then designate an initial flow for each pipe of the network at the initial stage of the computation. Once these initial setting has been completed, the Hardy Cross method which has been programmed for numerical solution on a digital computer can accomplish the computation, and outputs the flow distribution of the network. Here, an elementary circuit refers to a loop or a pseudo loop described in the Streeter reference mentioned above.

Determination of the elementary circuits and initial values, however, requires manual operation. This presents a problem because determining the elementary circuits in a complicated network of pipes is a very time consuming process. In addition, wasteful computations are often involved in the process owing to engineer's errors, such as selecting an unnecessary elementary circuit.

Likewise, since the initial values of flows are set by an intuition of an engineer, the increasing number of iteration of computation will be required unless the initial setting is appropriate. This also presents a problem in that it takes a long time to complete the computation.

SUMMARY OF THE INVENTION

It is therefore an object of the present invention to provide a method and apparatus for determining elementary circuits and initial values of flows in a pipe network, which can automatically determine the elementary circuits and initial values of flows in a pipeline network.

In a first aspect of the present invention, there is provided a method for determining elementary circuits and initial values of flows in a pipe network including one or more source nodes and a plurality of demanding nodes, the source nodes and demanding nodes being interconnected with pipes, and each of the pipes having a known resistance, the method comprising the steps of:

(a) determining a resistance of a passage from each of the source nodes to each one of the demanding nodes on the basis of the resistance of the pipes;

(b) determining, for each demanding node, a source node and a total resistance on the basis of the resistance of the passages, the total resistance being determined as the minimum resistance of the passages from the demanding node to the source nodes, and the source node being determined as a source node joined to the demanding node through the passage providing the total resistance;

(c) determining, for each of the pipes, an upstream node and a downstream node on the basis of the total resistances, the upstream node having less total resistance than the downstream node;

(d) designating a pipe joining one of the upstream nodes to one of the downstream nodes as an upstream pipe of that downstream node;

(e) selecting a pipe, which is never designated as an upstream pipe, as a circuit origin pipe;

(f) determining, for each of the source nodes and the demanding nodes, a node level on the basis of the upstream nodes and the downstream nodes by ignoring the circuit origin pipes of the pipeline network, the node level indicating the number of nodes included in the passage from the source node; and (g) determining elementary circuits, by tracing upstream nodes along a first route starting from a first node of one of the circuit origin pipes and along a second route starting from a second node of the circuit origin pipe in accordance with the node level of the upstream node of each pipe, until the first and second routes reach a same source node, or different source nodes, or a same demanding node, each of the elementary circuits being used as an element for determining a flow of each of the pipes.

Here, the method may further comprise the steps of:

dividing the pipeline network into the elementary circuits by assuming that a flow of each of the circuit origin pipes is zero so that each of the elementary circuits has a tree structure; and determining an initial flow of each pipe of the pipeline network by tracing the first route and second route by adding demand quantity of each node along the routes.

The method may further comprise the step of determining the flow of each pipe in the pipeline network by using the initial flow of each pipe obtained in the step of determining the initial flow.

The step of determining the flow may employ the Hardy Cross method.

The pipeline network may be a gas pipeline network.

The pipeline network may be a water pipeline network.

The pipeline network may be an electric power network, in which the flow is a current, and the pipeline is a power line.

In a second aspect of the present invention, there is provided a method for determining elementary circuits and initial values of flows in a pipe network including one or more source nodes and a plurality of demanding nodes, the source nodes and demanding nodes being interconnected with pipes, and each of the pipes having a known resistance, the method comprising the steps of:

(a) determining a resistance of a passage from each of the source nodes to each one of the demanding nodes on the basis of the resistance of the pipes;

(b) determining, for each demanding node, a source node and a total resistance on the basis of the resistance of the passages, the total resistance being determined as the minimum resistance of the passages from the demanding node to the source nodes, and the source node being determined as a source node joined to the demanding node through the passage providing the total resistance;

(c) determining, for each of the pipes, an upstream node and a downstream node on the basis of the total resistances, the upstream node having less total resistance than the downstream node;

(d) designating a pipe joining one of the upstream nodes to one of the downstream nodes as an upstream pipe of that downstream node;

(e) dividing the network into one or more tree structures by assuming flows of predetermined pipes as 0; and (f) determining an initial flow of each pipe of the pipeline network, by tracing upstream nodes along a first route starting from a first node of one of the predetermined pipes and along a second route starting from a second node of the predetermined pipe until the first and second routes reach the same source node, or different source nodes, or the same demanding node, and by adding demand quantity of each node along the routes.

In a third aspect of the present invention, there is provided an apparatus for determining elementary circuits and initial values of flows in a pipe network including one or more source nodes and a plurality of demanding nodes, the source nodes and demanding nodes being interconnected with pipes, and each of the pipes having a known resistance, the apparatus comprising:

(a) means for determining a resistance of a passage from each of the source nodes to each one of the demanding nodes on the basis of the resistance of the pipes;

(b) means for determining, for each demanding node, a source node and a total resistance on the basis of the resistance of the passages, the total resistance being determined as the minimum resistance of the passages from the demanding node to the source nodes, and the source node being determined as a source node joined to the demanding node through the passage providing the total resistance;

(c) means for determining, for each of the pipes, an upstream node and a downstream node on the basis of the total resistances, the upstream node having less total resistance than the downstream node;

(d) means for designating a pipe joining one of the upstream nodes to one of the downstream nodes as an upstream pipe of that downstream node;

(e) means for selecting a pipe, which is never designated as an upstream pipe, as a circuit origin pipe;

(f) means for determining, for each of the source nodes and the demanding nodes, a node level on the basis of the upstream nodes and the downstream nodes by ignoring the circuit origin pipes of the pipeline network, the node level indicating the number of nodes included in the passage from the source node; and (g) means for determining elementary circuits, by tracing upstream nodes along a first route starting from a first node of one of the circuit origin pipes and along a second route starting from a second node of the circuit origin pipe in accordance with the node level of the upstream node of each pipe, until the first and second routes reach a same source node, or different source nodes, or a same demanding node, each of the elementary circuits being used as an element for determining a flow of each of the pipes.

The above and other objects, effects, features and advantages of the present invention will become more apparent from the following description of the embodiment thereof taken in conjunction with the accompanying drawings.

BRIEF DESCRIPTION OF THE DRAWINGS

FIGS. 11A and 11B are diagrams showing a data table 100 containing data associated with nodes and a data table 110 containing data associated with pipes, after the first cycle of the stage 300 has been completed;

FIGS. 12A and 12B are diagrams showing the data tables 100 and 110 after the second cycle of the stage 300 has been completed;

FIGS. 14A, 14B and 14C are diagrams showing the data tables 100 and 110, and a data table 120 containing data associated with elementary circuits after the stage 400 has been completed;

FIGS. 16A and 16B are diagrams showing the data tables 100 and 110 after the first cycle of the stage 500 has been completed;

FIGS. 17A and 17B are diagrams showing the data tables 100 and 110 after the second cycle of the stage 500 has been completed;

DETAILED DESCRIPTION OF PREFERRED EMBODIMENTS

The invention will now be described with reference to the accompanying drawings.

Before explaining the details of the present invention, the outline thereof will be explained with reference to FIGS. 1–7.

Figure 1:
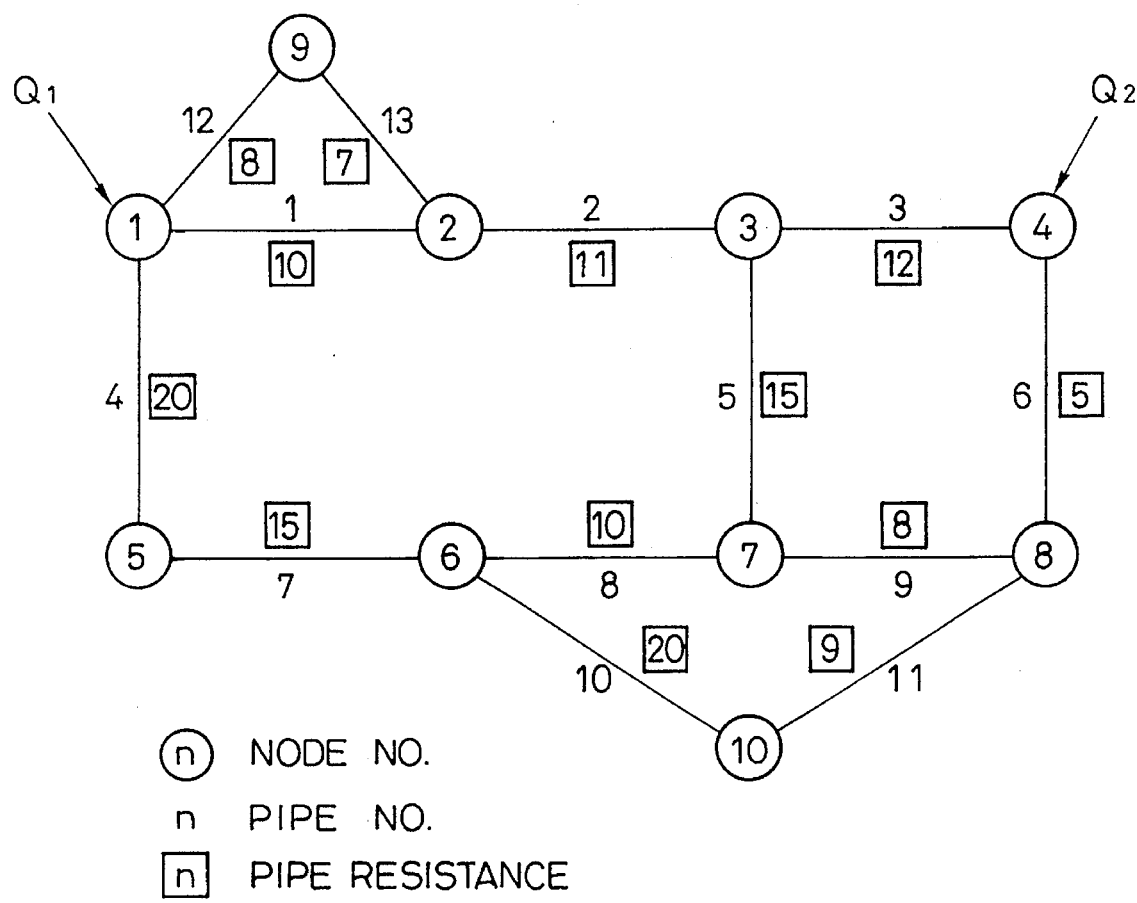
FIG. 1 is a diagram illustrating a pipeline network to which an embodiment in accordance with the present invention is applied.

FIG. 1 illustrates a network of pipes. In this FIGURE, nodes $N_1$–$N_{10}$ are joined by pipes $P_1$–$P_{13}$, and nodes $N_1$ and $N_4$ are source nodes. The other nodes $N_2$, $N_3$, $N_5$–$N_{10}$ are demanding nodes. The total numbers NN and PN of the nodes and pipes are 10 and 13, respectively, and the total number SN of the source nodes is 2. The two source node number 1 and 4 are expressed as SN(1)=1 and SN(2)=4. A pipe resistance RES(j) is given for each pipe $P_j$ in advance. In this specification, the resistance of a pipe is defined as $(p_1^2-p_2^2)/Q^2$ using the variables in Equation (1) of Chapter 2 of "Gas Engineers Handbook", C. H. Burnham, et al , The Industrial Press, New York, 1966.

Figure 2:
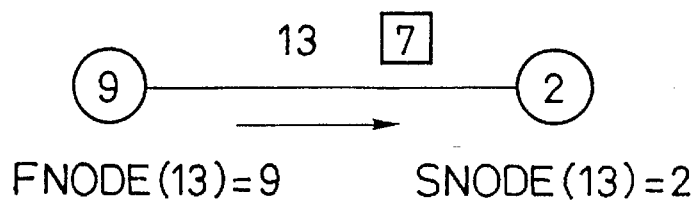
FIG. 2 is a diagram illustrating a pipe $P_{13}$ and its first node FNODE(13) and second node SNODE(13)

FIG. 2 illustrates a pipe $P_j$ and two nodes at its ends, that is, a first node and a second node, which are determined arbitrary. The number of the first node and the number of the second node are expressed as FNODE(j) and SNODE(j). In this FIGURE, the pipe $P_j$=$P_{13}$, the first node number FNODE(13)= 9, and the second node number SNODE(13)= 2. The resistance of the pipe $P_{13}$ is expressed as RES(13)=7.

Figure 3:
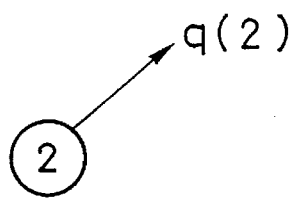
FIG. 3 is a diagram illustrating a demand quantity q(2) of a node $N_2$.

FIG. 3 illustrates the demand quantity q(i) of the node $N_i$. For example, the demand quantity of the node $N_2$ can be expressed as q(2).

The total resistance SD(i) from the source node to the node $N_i$ is defined as follows: First, a plurality of passages from each one of the source nodes to the node $N_i$ are specified. Second, the total resistance of each of the passages is calculated. Third, the minimum total resistance is selected as the total resistance SD(i).

For example, the total resistance of the node $N_2$ is obtained as follows: First, passages from the source node $N_1$ to the node $N_2$, and passages from the source node $N_4$ to the node $N_2$ are specified. In this case, the pipe $P_1$, and the pipes $P_{12}$ and $P_{13}$ are obtained as passages from the source node $N_1$ to the node $N_2$, and the pipes $P_3$ and $P_2$ is obtained as a passage from the source node $N_4$ to the node $N_2$. The total resistances of these passages are 10, 15, and 23, respectively. As a result, the total resistance SD(2) is 10, that is, the total resistance of the passage passing through the pipe $P_1$.

Figure 4:
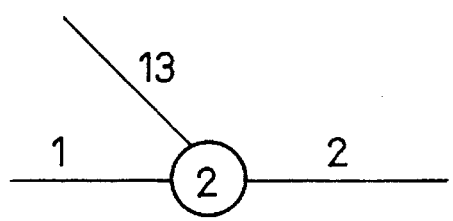
FIG. 4 is a diagram illustrating the upstream pipe UPIPE(2) of the node $N_2$.

FIG. 4 illustrates the upstream pipe number UPIPE(i) of the node $N_i$. The upstream pipe number UPIPE(i) is specified as the number of a pipe which is joined to the node $N_i$ and which constitutes the passage associated with the total resistance SD(i). In other words, the upstream pipe UPIPE(i) leads the node $N_i$ to the source node with the minimum resistance. For example, in FIG. 4, the upstream pipe number of the node $N_2$, that is, UPIPE(2)=1.

The upstream node number UNODE(j) and the downstream node number DNODE(j) of a pipe $P_j$ are specified by comparing the total resistances SD from the source node to the two nodes at the ends of the pipe $P_j$. The node having a smaller total resistance is the upstream node whose number is UNODE(j), and the node having a larger total resistance is the downstream node whose number is DNODE(j). For example, in FIG. 1, since the nodes $N_2$ and $N_9$ have total resistances of 10 and 8, respectively, the upstream node of the pipe $P_{13}$ is the node $N_g$, and the downstream node of the pipe $P_{13}$ is the node $N_2$. Thus, UNODE(13)=9 and DNODE(13)=9.

Figure 5:
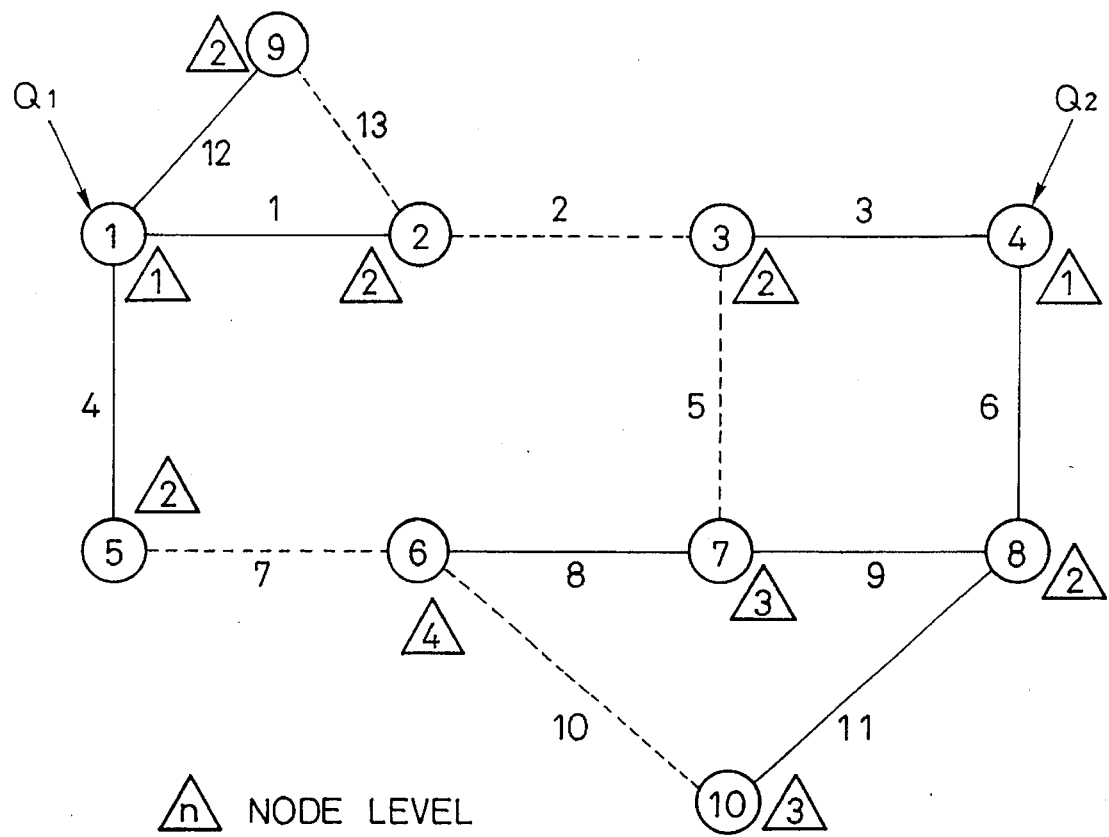
FIG. 5 is a diagram illustrating circuit origin pipes and node levels of the network shown in FIG. 1.

In FIG. 5, dotted lines indicate circuit origin pipes. A circuit origin pipe is a pipe that is never used as an upstream pipe. For example, the pipe $P_2$ is joined to the nodes $N_2$ and $N_3$, and the upstream pipe of the node $N_2$ is the pipe $P_1$ and that of the node $N_3$ is the pipe $P_3$. Thus, the pipe $P_2$ is not used as the upstream pipe, and hence it is a circuit origin pipe. Likewise, the pipes $P_5$, $P_7$, $P_{10}$ and $P_{13}$ are circuit origin pipes.

The circuit origin pipe will be described in more detail below. When a network of pipes includes only one source node and no loop circuit, the flow of each pipe can be determined by merely summing demand flows of the nodes regardless of pressure. On the other hand, when a network of pipes includes a plurality of source nodes and/or loop circuits, some unknown flows arise, and hence it becomes necessary to determine in advance these unknown flows. The flows of the circuit origin pipes correspond to the unknown in the computation of the pipe network. Accordingly, computation time will become shorter as the flows of the circuit origin pipes, which are assumed in advance, are set closer to the resultant values. For this reason, pipes of the least possible flows are selected as circuit origin pipes, and the flows of these pipes are set to zero. To select the least possible flow pipes, the total resistance SD from the source node to each node is computed, and pipes joined to nodes whose total resistance SD is as large as possible are specified as having the least possible flows.

After the circuit origin pipes are determined, a node level of each node is determined. FIG. 5 illustrates the node level LEVEL(i) of the node $N_i$, which is specified as the number of nodes from the source node to that node $N_i$. The node level is specified for each node in the network of pipes after removing the circuit origin pipes. For example, the circuit origin pipes which are shown by dotted lines in FIG. 5 are removed from the network, and then the node levels are determined for all nodes as shown by numerals in small triangles. The node levels of the source nodes $N_1$ and $N_4$ are 1, and the node levels of the nodes $N_2$, $N_5$ and $N_9$ next to the source node $N_1$ are 2. The node levels of the nodes $N_3$ and $N_8$ which are joined to the source node $N_4$ are also 2, and the node level of the node $N_6$ which is the third downstream node from the source node $N_4$ is 4. Thus, the node levels are determined.

After the node levels have been determined, the elementary circuits are determined. First, one of the circuit origin pipes is selected as an origin, and then the nodes are traced upstream as shown in FIGS. 6A–6E.

Figure 6A:
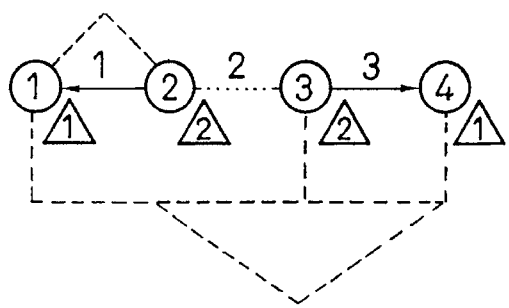
FIGS. 6A–6E are diagrams illustrating elementary circuits.

Let us consider the circuit origin pipe $P_2$ in FIG. 6A. The nodes at the ends of the circuit origin pipe $P_2$ are nodes $N_2$ and $N_3$ whose levels are 2. Tracing the upstream pipes of the nodes $N_2$ and $N_3$, the next nodes $N_1$ and $N_4$ whose levels are 1 are reached. Since the nodes $N_1$ and $N_4$ are source nodes, the upstream trace is completed here, and one of the elementary circuits is determined. That is, the circuit joining the nodes $N_1$, $N_2$, $N_3$ and $N_4$ is selected as the elementary circuit $C_1$ as shown in FIG. 6A.

Figure 6B:
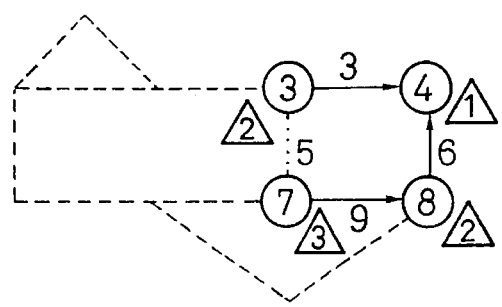

With regard to the circuit origin pipe $P_5$ shown in FIG. 6B, the node levels of the nodes $N_3$ and $N_7$ at its ends are 2 and 3, respectively. The node $N_7$ whose node level is 3 is joined to the upstream node $N_8$ whose node level is 2. Then, the nodes $N_3$ and $N_8$ whose node levels are 2 are joined to the source node $N_4$. Thus, the elementary circuit $C_2$ is determined as shown in FIG. 6B.

Figure 6C:
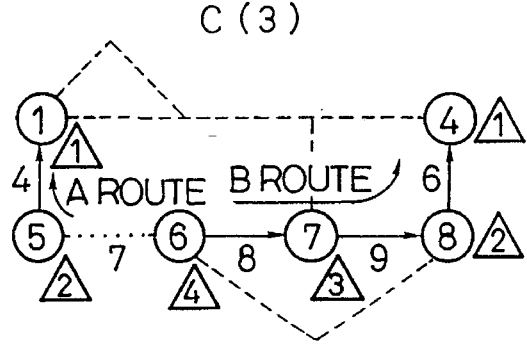

With regard to the circuit origin pipe $P_7$ shown in FIG. 6C, the node levels of the nodes $N_5$ and $N_6$ at its ends are 2 and 4, respectively. The node $N_6$ whose node level is larger than that of node $N_5$ is joined successively to the upstream node $N_7$ and then to $N_8$ whose node level is 2. After that, the nodes $N_5$ and $N_8$ whose node levels are 2 are joined to the source nodes $N_1$ and $N_4$, respectively. Thus, the elementary circuit $C_3$ is obtained as shown in FIG. 6C.

Figure 6D:
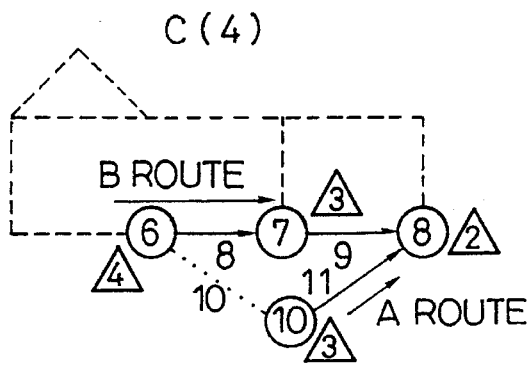

With regard to the circuit origin pipe $P_{10}$ shown in FIG. 6D, the node levels of the nodes $N_6$ and $N_{10}$ at its ends are 4 and 3, respectively. The node $N_6$ whose node level is larger than that of node $N_{10}$ is joined to the upstream nodes $N_7$ whose node level is 3. After that, the nodes $N_7$ and $N_{10}$ whose node levels are 3 are both joined to the nodes $N_8$ whose node level is 2. Since the nodes $N_7$ and $N_{10}$ are joined to the same node $N_8$, it is decided that the trace is completed here. Thus, the elementary circuit $C_4$ is specified as shown in FIG. 6D.

Figure 6E:
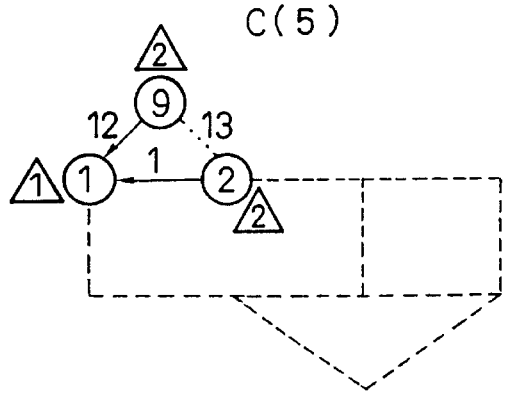

Similar steps are taken for the circuit origin pipe $P_{13}$, and the elementary circuit $C_5$ is obtained as shown in FIG. 6E.

Figure 7:
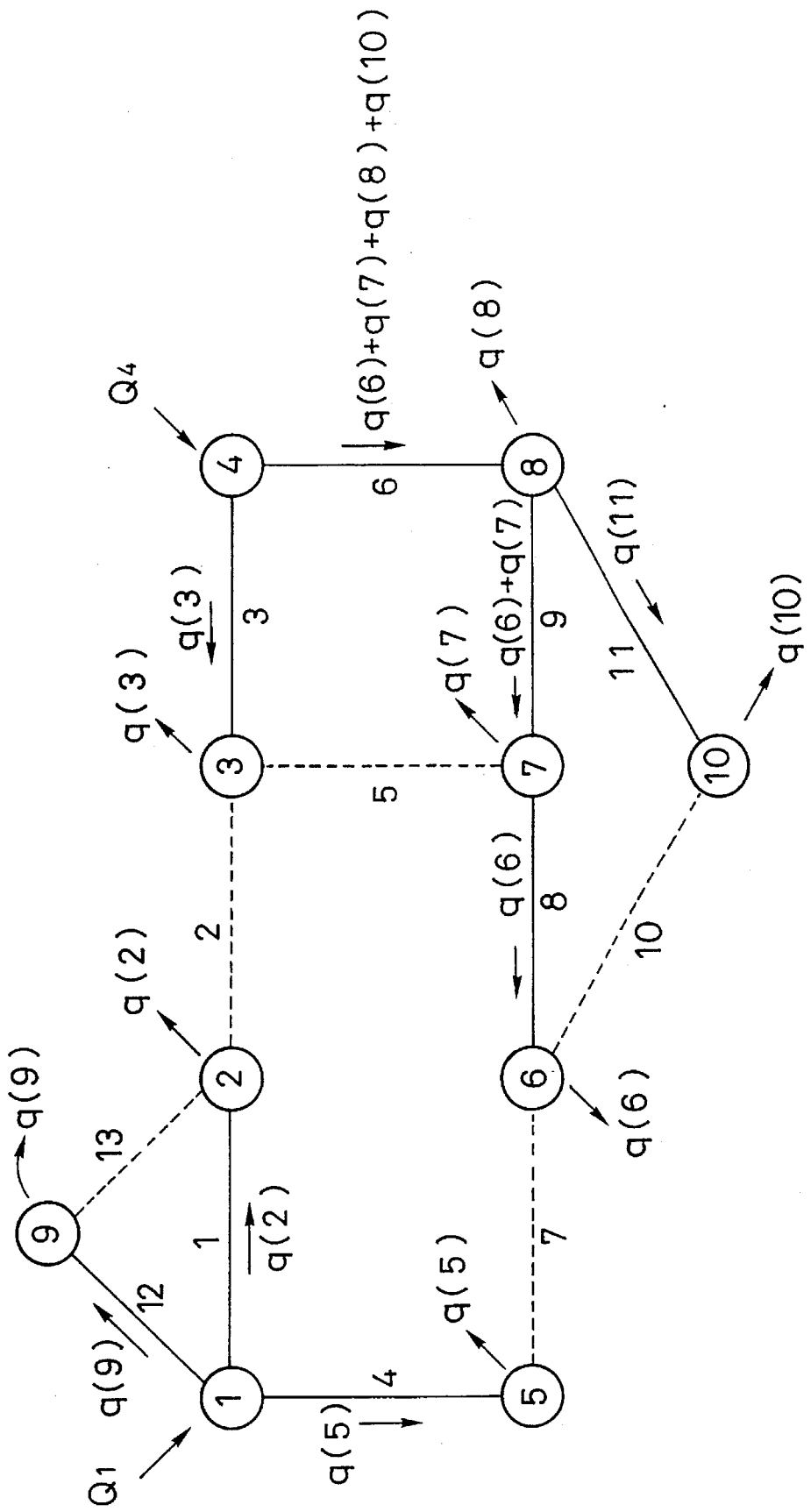
FIG. 7 is a diagram illustrating computation of initial values of flows of the pipeline network shown in FIG. 1.

By setting the flows of the circuit origin pipes to zero, the network takes tree structure as shown in FIG. 7. In this state, the initial values of the flows are determined based on a demand quantity q(i) of each node.

In FIG. 7, the nodes $N_2$, $N_3$, $N_5$, $N_6$, $N_9$ and $N_{10}$ are handled as terminal nodes after removing the circuit origin pipes. Therefore, the flow of each pipe joined to each one of the terminal nodes equals the demand quantity q of that node. For example, the flow of the pipe $P_8$ joining the node $N_6$ to the node $N_7$ equals the demand quantity q(6) of the node $N_6$. The flow of the pipe $P_9$ joining the node $N_7$ to the node $N_8$ equals the sum q(6)+q(7). Likewise, the flow of the pipe $P_{11}$ joining the node $N_{10}$ to the node $N_8$ equals q(10). Therefore, the flow of the pipe $P_6$ joining the node $N_8$ to the source node $N_4$ is the sum total q(6)+q(7)+q(8)+q(10). In this way, the initial values of flows of the pipes are set.

After the elementary circuits $C_1$–$C_5$, and the initial values of flows have been determined as described above, the flow of each pipe of the network is computed by the Hardy Cross method. This method performs the balancing of each elementary circuit in the network successively, and then repeats in an iterative manner until the sum of all flow corrections is less than a specified tolerance. In other words, the flow of each circuit origin pipe is successively approximated to solutions, which are obtained in an iterative manner until the differences between the current solutions and their previous counterparts become less than the specified tolerance. Details of the Hardy Cross method are described on pages 427–438 in "Fluid Mechanics"V. L. Streeter, et al., McGraw-Hill Book Co., 1985, as stated before.

Figure 8:
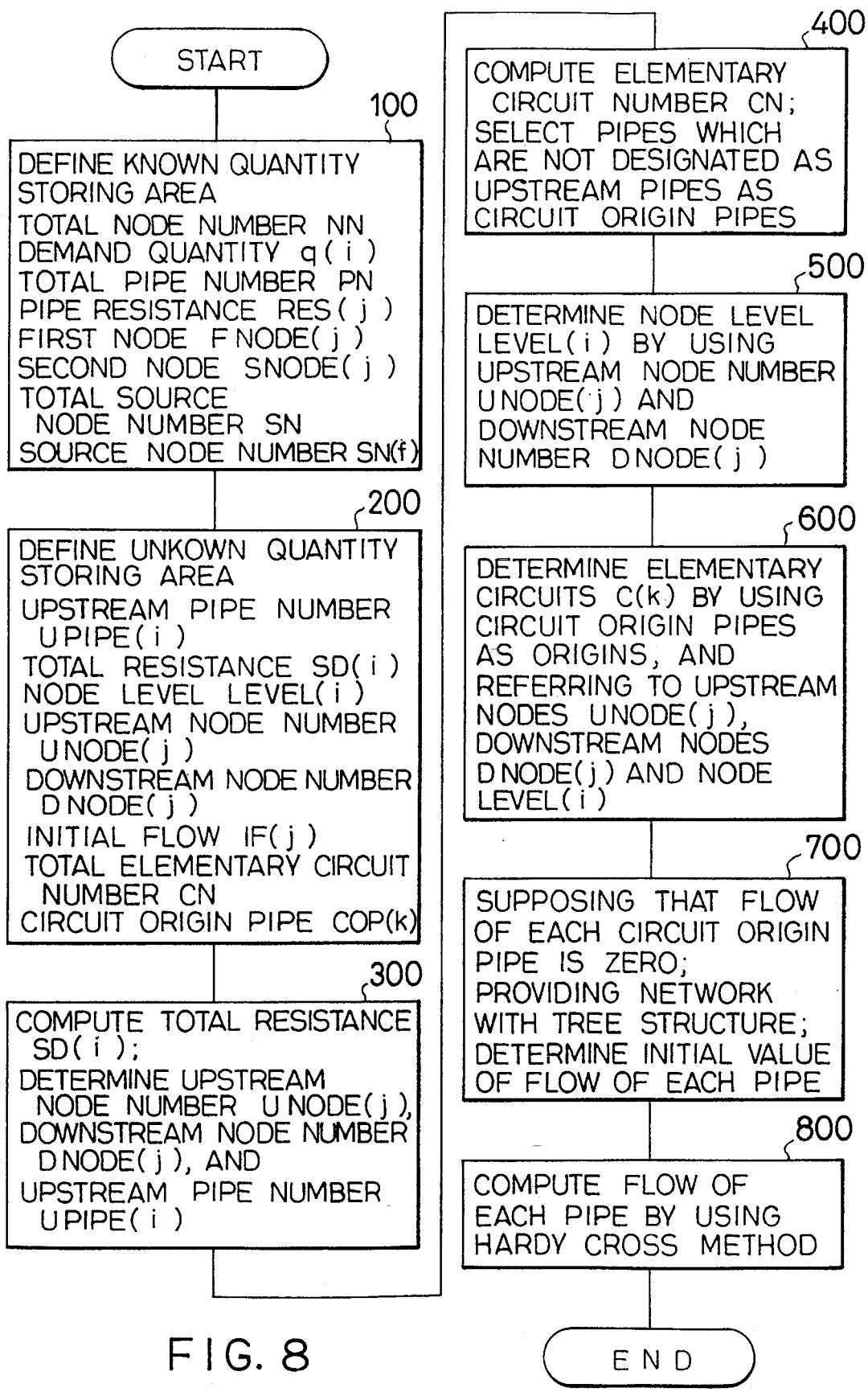
FIG. 8 is a general flowchart showing stages for determining the elementary circuits, setting initial values of flows, and computing the flows.

The process described above will be summarized as shown in FIG. 8.

In stage 100, known quantities are defined and stored in a memory. These includes the total number NN of the nodes $N_i$, demand quantity q(i) of each node $N_i$, the total number PN of the pipes $P_j$, the resistance RES(j) of each pipe $P_j$, first and second nodes FNODE(j) and SNODE(j) of the pipe $P_j$, the total number SN of the source nodes, and the source node number SN(f). Here, f is 1 and 2, and SN(1)=1 and SN(2)=4 in FIG. 1, because the source nodes are $N_1$ and $N_4$.

In stage 200, areas for unknown quantities are defined in a memory. The unknown quantities are the upstream pipe number UPIPE(i) of the node $N_i$, the total resistance SD(i) from the source node to the node $N_i$, the node level LEVEL(i), the upstream node number UNODE(j) and the downstream node number DNODE(j) of the pipe $P_j$, the initial flow IF(j) of the pipe $P_j$, the total number of the elementary circuits CN, and the circuit origin pipe C(k). Here, k is the sequential number of the elementary circuits, and takes values 1, 2, 3, 4, and 5 as shown in FIGS. 6A–6E.

In stage 300, the total resistance SD of each node from the source node is computed. As stated before, the total resistance SD(i) is defined as the minimum resistance in the resistances from all the source nodes to the node $N_i$, and the source node which gives the minimum resistance is specified as the source node of that node $N_i$. The upstream node number UNODE(j) and downstream node number DNODE(j) of each pipe $P_j$, and the upstream pipe number UPIPE(i) of each node $N_i$ are determined on the basis of the total resistances SD.

In stage 400, the number of elementary circuits CN is computed. Subsequently, the pipes which are not designated as the upstream pipes are selected as the circuit origin pipes.

In stage 500, the node level LEVEL(i) from the source node to the node $N_i$ is determined for each node $N_i$ by using the upstream node number UNODE(j) and downstream node number DNODE(j) of each pipe $P_j$.

In stage 600, the elementary circuits C(k) are determined by using the circuit origin pipes as origins and referring to the upstream nodes UNODE(j), downstream nodes DNODE(j) and the node levels LEVEL(i).

In stage 700, the flow of each circuit origin pipe is assumed to be zero so that the network is provided with tree structure. After that, an initial value of the flow of each pipe of the network is determined.

In stage 800, the flow of each pipe is computed by using the Hardy Cross method. In this process, the flow of each circuit origin pipe is successively approximated to solutions, which are obtained in an iterative manner continued until the differences between the current solutions and their previous counterparts become less than a predetermined threshold.

EMBODIMENT

Figure 9:
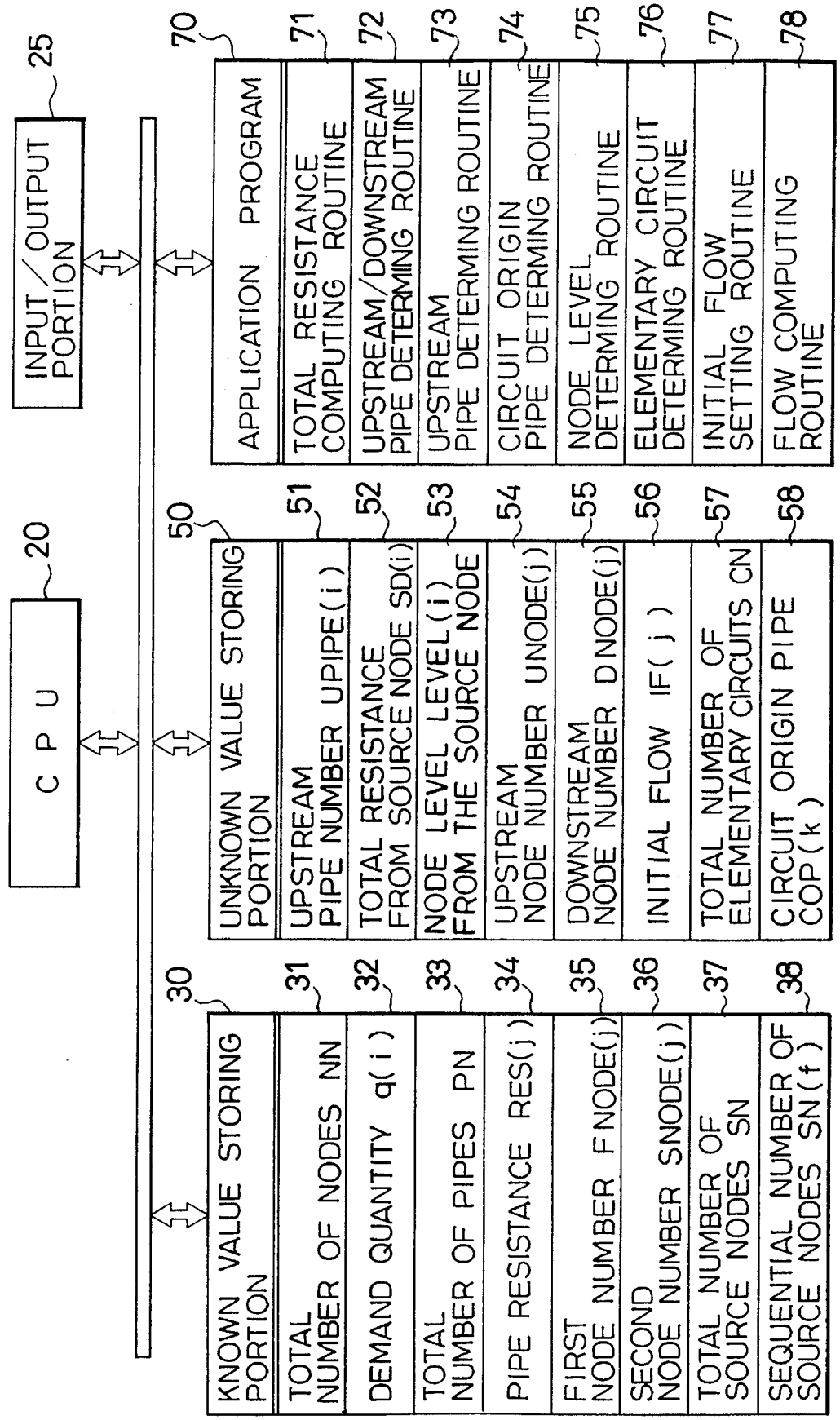
FIG. 9 is a block diagram showing an apparatus for executing the processes of FIG. 8.

FIG. 9 is a block diagram showing an embodiment of a system in accordance with the present invention.

In this FIGURE, reference numeral 20 designates a CPU. The CPU 20 is connected to an input/output device 25, a known value storing portion 30, an unknown value storing portion 50, and an application program storing portion 70.

The known value storing portion 30 comprises memory areas 31–38 for storing the total number NN of the nodes, the demand quantity q(i) of each node $N_i$, the total number PN of pipes, the resistance RES(j) of each pipe $P_j$, a first node number FNODE(j) of a pipe $P_j$, a second node number SNODE(j) of the pipe $P_j$, the total number SN of the source nodes, and the sequential number SN(f) of the source nodes. These values have been inputted in advance from the input/output portion 25 to the areas 31–38.

The unknown value storing portion 50 comprises memory areas 51–58 for storing the upstream pipe number UPIPE(i) of the node $N_i$, the total resistance SD(i) from the source node to the node $N_i$, the node level LEVEL(i) of the node $N_i$ from the source node, the upstream node number UNODE(j) of the pipe $P_j$, the down stream node number DNODE(j) of the pipe $P_j$, the initial flow IF(j) of the pipe $P_j$, the total number of the elementary circuits CN, and the circuit origin pipe C(k).

The application program comprises a total resistance computing routine 71, an upstream/downstream pipe determining routine 72, an upstream pipe determining routine 73, a circuit origin pipe determining routine 74, a node level determining routine 75, an elementary circuit determining routine 76, an initial flow setting routine 77 and a flow computing routine 78.

Referring to FIGS. 10–19, each of the stages 300–800 will be described in more detail.

Figure 10:
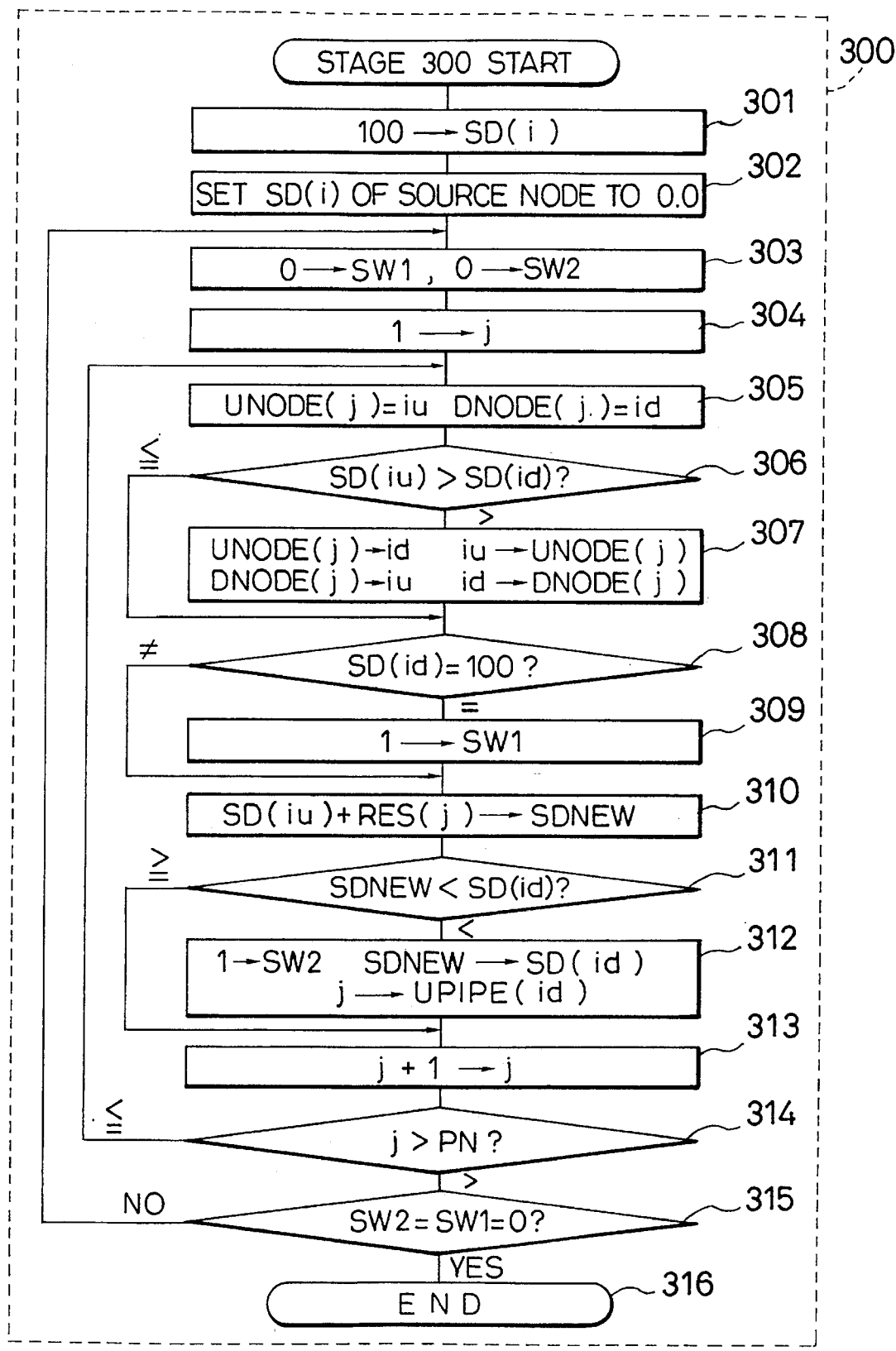
FIG. 10 is a flowchart illustrating the procedure of stage 300 for computing total resistances, obtaining an upstream node and downstream node of each pipe, and obtaining an upstream pipe of each node.

FIG. 10 is a flowchart showing the process of the stage 300 executed by the CPU 20. In this process, data as shown in FIGS. 11A and 11B are used.

FIG. 11A illustrates a data table 100 associated with nodes $N_i$. The data table 100 consists of four columns: a column 101 for storing the node numbers i; a column 102 for storing the upstream pipe numbers UPIPE(i); a column 103 for storing the total resistances SD(i) from the node $N_i$ to the source node; and a column 104 for storing node levels LEVEL(i) of the node $N_i$. FIG. 11B illustrates a data table 110 associated with the pipes $P_j$. The table 110 consists of four columns: a column 111 for storing the pipe numbers j; a column 112 for storing pipe resistances RES(j); a column 113 for storing the upstream node numbers UNODE(j); and a column 114 for storing downstream node numbers DNODE(j). The upstream node numbers UNODE(j) and downstream node numbers DNODE(j) have been set in advance at the leftmost positions in the columns 113 and 114. The data tables 100 and 110 are set in the internal memory of the CPU 20.

At step 301 of FIG. 10, each total resistance SD in the column 103 is set to an initial value 100 which cannot take place actually. At step 302, the total resistance SD of each of the source nodes $N_1$ and $N_4$ is changed to 0.0. The source nodes $N_1$ and $N_4$ are known in advance. As a result, the leftmost numbers in the column 103 of the data table 100 have been set as the total resistance SD(i) as shown in FIG. 11A.

At step 303, switches SW1 and SW2 are set to 0. The switch SW1 indicates that at least one of the initial values 100 of the total resistances still remains in the column 103. The switch SW2 indicates that the total resistance SD is changed. At step 304, a parameter j for selecting the pipe in ascending order is set at its initial value of 1.

At step 305, the upstream node number UNODE(j) and downstream node number DNODE(j) of the pipe $P_j$ are substituted into $i_u$ and $i_d$, respectively. At step 306, the total resistances $SD(i_u)$ and $SD(i_d)$ are compared. If the total resistance $SD(i_u)$ of the upstream node is greater than the total resistance $SD(i_d)$ of the downstream node, that is, if $SD(i_u) > SD(i_d)$, the processing proceeds to the next step 307, whereas if $SD(i_u) \leq SD(i_d)$, it proceeds to step 308. At step 307, the upstream node number UNODE(j) and the downstream node number DNODE(j) are interchanged so that the total resistance of the upstream node becomes smaller than that of the downstream node.

For example, for the pipe $P_1$, the upstream node number UNODE(1)=1 and the downstream node number DNODE(1)=2 are obtained from the data table 110. In this case, since SD(1)=0.0 and SD(2)=100 as shown in the data table 100 of FIG. 11A, the total resistance of the upstream node $N_1$ is smaller than that of the downstream node $N_2$, that is, SD(1) $\leq$ SD(2). As a result, the node interchange at step 307 is not carried out.

On the other hand, for the pipe $P_3$, the upstream node number UNODE(3)=3 and the downstream node number DNODE(3)=4 is obtained from the data table 110. In this case, since SD(3)=100 and SD(4)=0.0 as shown in the data table 100, the total resistance of the upstream node $N_3$ is greater than that of the downstream node $N_4$, that is, SD(3)>SD(4). As a result, the node interchange at step 307 is carried out so that the node $N_3$ becomes a downstream node and the node $N_4$ becomes an upstream node as shown at the line of the pipe $P_3$ of the data table 110 of FIG. 11B.

At step 308, the total resistance $SD(i_d)$ of the downstream node is compared with the initial value 100. If SD equals 100, the processing proceeds to the next step 309, where the switch SW1 is turned to 1, whereas if SD differs from 100, the processing proceeds to step 310. For example, since the total resistance SD(2) of the node $N_2$ is 100 as shown in the data table 100, the switch SW1 is turned to 1 in this case. At step 310, the resistance RES(j) of the pipe $P_j$ is added to the total resistance $SD(i_u)$ of the upstream node, and the sum is substituted into SDNEW. The SDNEW is a candidate of the total resistance SD of the downstream node of the pipe $P_j$.

At step 311, the SDNEW is compared with $SD(i_d)$. If SDNEW<$SD(i_d)$, the processing proceeds to the next step 312, whereas if SDNEW$\geq$SD $(i_d)$, it proceeds to step 313. At step 312, SDNEW is substituted into $SD(i_d)$ so that SDNEW becomes a new total resistance of the downstream node. In addition, the switch SW2 is turned to 1, and j is substituted to the upstream pipe number UPIPE($i_d$) in the column 102 of the data table 100. For example, for the pipe $P_1$, the resistance 10 of the pipe $P_1$ is obtained from the column 112 of the data table 110, and is added to the total resistance (SD=0) of the upstream node $N_1$. The total resistance SD(2) of the node $N_2$ is changed from 100 to 10 in the table 100. In addition, the upstream pipe number UPIPE(2) of the node $N_2$ is specified as 1 (=j) as shown in FIG. 11A.

At step 313, the parameter j is incremented to j+1 so that the next pipe of the data table 110 is selected to be processed. At step 314, j is compared with the total number PN of the pipes. If j>PN, that is, if all the pipes have been processed, the processing proceeds to step 315. If j$\leq$PN, that is, if at least one pipe remains to be processed, the processing returns to step 305.

At step 315, the switches SW1 and SW2 are tested if they are both 0. If both of them are 0, the process of stage 300 is completed. If at least one of them is not 0, the processing returns to step 303. This is because the switch SW1 whose value is 1 indicates that the total resistance SD whose value is 100 still remains, which means that the process of stage 300 has not yet completed, and the switch SW2 whose value is 1 indicates that the total resistance SD is changed, which means that it is not clear whether the process of stage 300 has been completed or not. In this case, the processing returns to step 303 to begin the process again.

In the first cycle of the procedure from steps 303–315, the upstream node and the downstream node of each of the pipes $P_3$, $P_9$ and $P_{11}$ have been interchanged as shown in FIG. 11B. Furthermore, the upstream pipe numbers UPIPE of the nodes $N_3$, $N_7$ and $N_{10}$, and the total resistances SD of the nodes $N_2$, $N_3$ and $N_5$–$N_{10}$ have been changed as shown in FIG. 11A. In particular, the total resistance SD(3) of the node $N_3$ has been changed twice: one during the processing with regard to the pipe $P_2$, and the other during the processing on the pipe $P_3$. Similar changes are seen about the nodes $N_7$ and $N_{10}$.

Since the switches SW1 and SW2 have been turned to 1 at steps 309 and 312 in the first cycle, the processing enters the second cycle of the procedure from steps 303–315. In the second cycle, the upstream node and the downstream node of the pipe $P_8$ have been interchanged during the processing of the pipe $P_8$ as shown in FIG. 12B. In connection with this, the upstream pipe UPIPE(6) of the node $N_6$ has been changed from $P_7$ to $P_8$, and the total resistance SD(6) has been changed from 35 to 23 through steps 310–313 as shown in FIG. 12A. The change in the total resistance SD was performed at step 312, and hence the switch SW2 was changed to 1 during this process.

In this second cycle, the upstream node and the downstream node of the pipe $P_{10}$ have also been interchanged as shown in FIG. 12B. In this case, however, no data in the data table 100 associated with the nodes has been changed. This is because SDNEW$\geq$SD($i_d$) holds at step 311.

Since the switch SW2 has been turned to 1 during the second cycle, the processing enters the third cycle of the procedure from steps 303–315. In the third procedure, no change in the data takes place, and hence both switches SW1 and SW2 are kept 0. Thus, the data processing in stage 300 has been completed.

In stage 300, although the upstream nodes and the downstream nodes are freely set at the initial set, they are correctly determined by the procedure describe above, leaving the results as shown in FIGS. 12A and 12B.

The stage 400 will now be described below. The stage 400 finds pipes which do not serve as the upstream pipes, and sets them as the circuit origin pipes.

Figure 13:
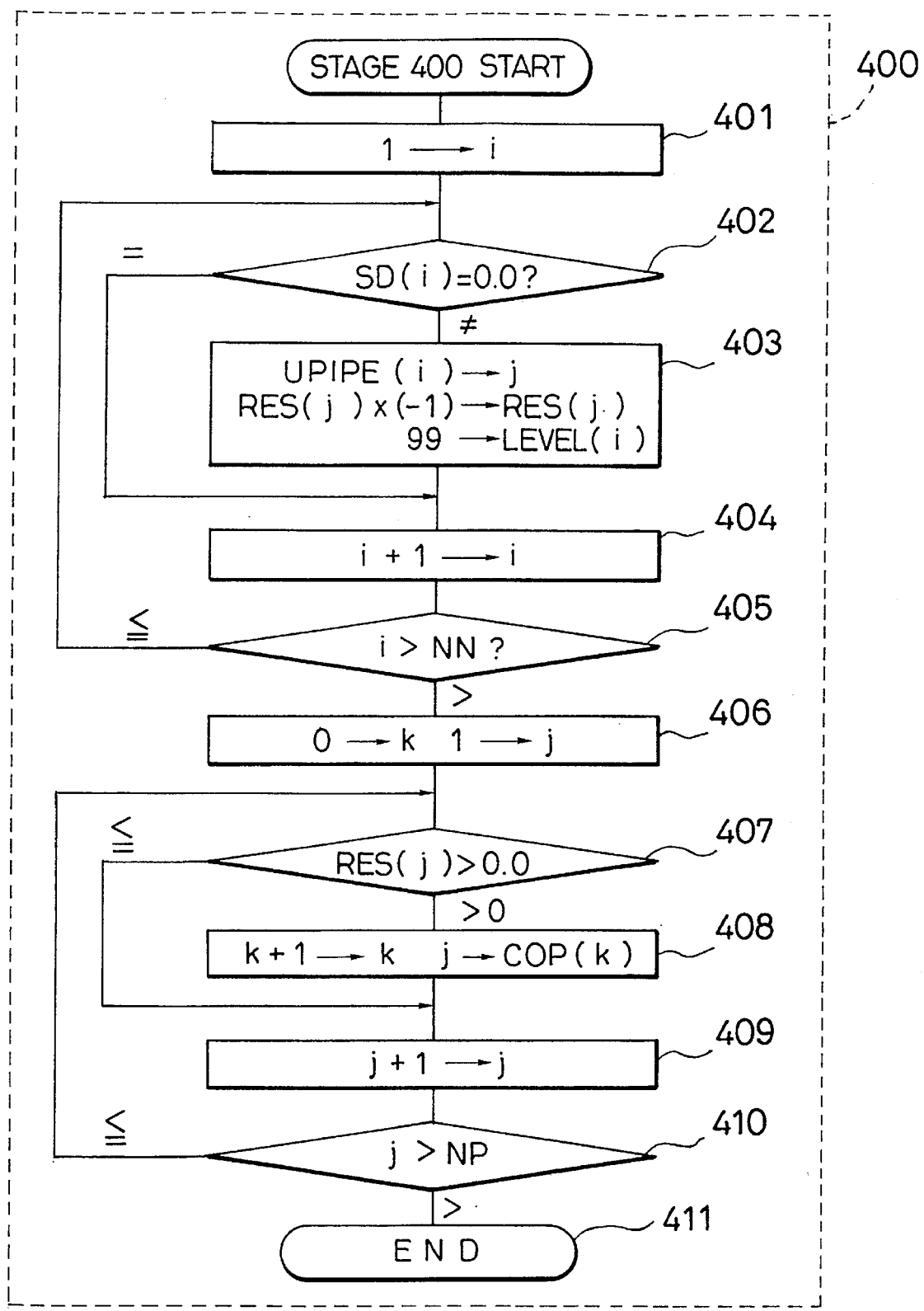
FIG. 13 is a flowchart illustrating the procedure of stage 400 for obtaining circuit origin pipes.

FIG. 13 is a flowchart showing the process of stage 400 executed by the CPU 20. In this FIGURE, the procedure from step 401 to 405 inverts the sign of the resistances RES of the upstream pipes, and sets the node level of each node to an initial value 99, for example. The procedure from step 406 to step 410 selects the circuit origin pipes.

At step 401, the node number i is set at its initial value 1 so that the nodes in the data table 100 are processed in ascending order from i=1 to NN (=10). At step 402, the total resistance SD(i) of the node $N_i$ is tested whether it is zero or not. If it is zero, the node $N_i$ is a source node having no upstream pipe, and the processing proceeds to step 404. In contrast, if it is not zero, the node $N_i$ has an upstream pipe whose number is UPIPE(i), and the processing proceeds to the next step 403. At step 403, the sign of the resistance RES of the upstream pipe whose number is UPIPE(i) is reversed. For example, the upstream pipe of the node $N_2$ is $P_1$, and hence the resistance RES of the pipe $P_1$ is reversed to −10 as shown in FIG. 14B. In addition, the node level of the node $N_i$ is set at 99.

At step 404, the node number i is incremented to i+1 so that the next node of the data table 100 of FIG. 14A is selected. At step 405, it is tested whether i>NN. If i>NN, the processing proceeds to the next step 406, and if i≦NN, the processing returns to step 402 so as to process the next node. When the procedure from step 402 to step 405 has been completed, the column 104 of the data table 100 and the column 112 of the data table 110 have been changed as shown in FIGS. 14A and 14B. Here, the value "99" is chosen because the node level can never reach 99, and so it will surely be changed to another value. The inversion of the sign of the resistance RES is for identifying upstream pipes, and hence it may be replaced with flags, each of which is attached to each one of the nodes.

The procedure from step 406 to step 410 sequentially tests the value of the resistance RES of each pipe $P_j$. If the resistance RES is negative or zero, the procedure jumps to step 409. In contrast, if the resistance RES is positive, the procedure proceeds to step 408 where it increments the number k that indicates the sequential number of pipes whose resistance is positive, and sets the pipe number j into the column 122 of the elementary circuit table 120 of FIG. 14C as a circuit origin pipe. In this case, the pipes $P_2$, $P_5$, $P_7$, $P_{10}$ and $P_{13}$ are selected as the circuit origin pipes from the data table 110, and are registered in the column 122 of the data table 120. Thus, the pipes which do not serve as an upstream pipe are selected as the circuit origin pipes.

Figure 15:
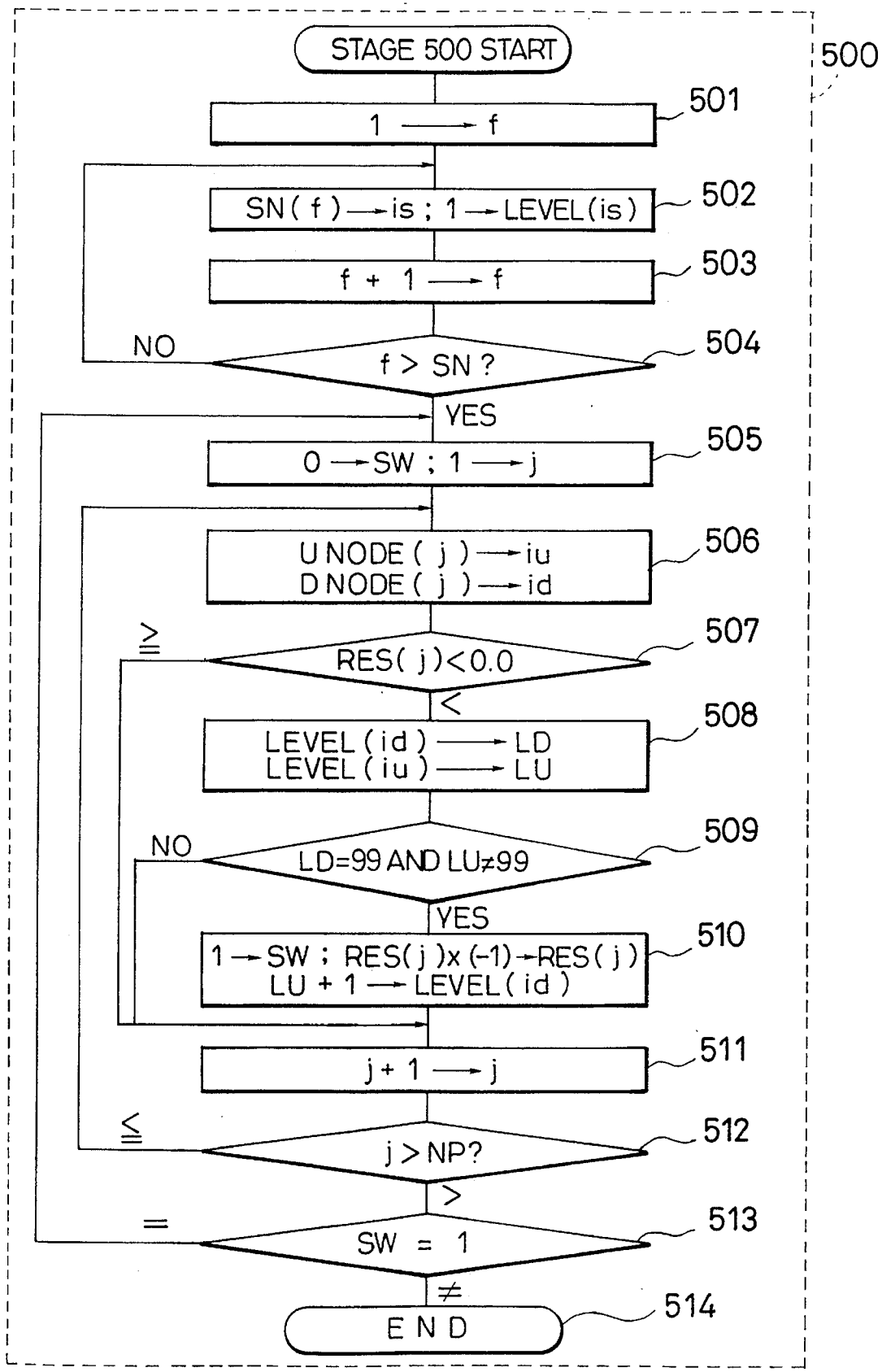
FIG. 15 is a flowchart illustrating the procedure of stage 500 for computing a node level of each node.

FIG. 15 is a flowchart showing the process of stage 500 executed by the CPU 20.

In this FIGURE, the procedure from step 501 to step 504 sets the node level of the source nodes $N_1$ and $N_4$ to 1. The procedure from step 505 to step 513 sets the node levels of the demanding nodes $N_2$, $N_3$, and $N_5$–$N_{10}$.

At step 501, a parameter f is set to 1. At step 502, the source node SN(f) is read from the memory, and its level is set to 1. At step 503, f is incremented to f+1. At step 504, f is compared with SN, and returns to step 502 if f≦SN. If f>SN, the processing proceeds to step 505. Thus, the node levels of all source nodes are set to 1.

At step 505, the pipe number j is initially set to 1, so that the pipes in the data table 110 are selected in ascending order from 1 to PN. In addition, a switch SW is set to 0. The switch SW of value 1 indicates the possibility that the process has not yet completed, and hence the processing returns from step 513 to step 505.

At step 506, the upstream node number and the downstream node number of the pipe $P_j$ are substituted into $i_u$ and $i_d$. At step 507, the resistance RES(j) of the pipe $P_j$ is compared with 0.0, and the processing proceeds to the next step 508 if RES(j) is negative, and proceeds to step 511 if RES≧0.0. In other words, if the pipe $P_j$ is a circuit origin pipe, whose resistance RES(j) has been set as positive or zero, it undergoes no data processing.

At step 508, the level of the downstream node whose number is $i_d$ and the level of the upstream node whose number is $i_u$, which are associated with the pipe $P_j$ whose resistance RES(j) has been set as negative, are substituted to LD and LU, respectively. At step 508, the processing tests to determine whether the node level LD of the downstream node equals 99, and the node level LU of the upstream node differs from 99. If the answer is positive, the processing proceeds to the next step 510, whereas if the answer is negative, it proceeds to step 511.

At step 510, the switch is changed to 1, and the resistance RES(j) of the pipe $P_j$ is returned to the positive value. In addition, the node level of the downstream node LEVEL($i_d$) is set to LU+1. Thus, the node level of the downstream node is set to the node level of the upstream node plus 1. For example, the node level of the node $N_2$ is set to 2 because the node level of the upstream node $N_1$ is 1. The procedure from step 506 to 512 is repeated for each of the pipes $P_1$–$P_{13}$ of the data table 110, and if j exceeds the total number PN (=13) of the pipes, the processing proceeds from step 512 to step 513.

At step 513, the switch SW is tested whether it is 1 or not. If SW=1, some node levels may be undetermined. Accordingly, the processing returns to step 505, and the procedure from step 505 to step 513 is repeated again.

FIGS. 16A and 16B shows the state when the first cycle of the procedure from step 505 to 513 has been completed. Although the node level of the node $N_6$, which is the downstream node of the pipe $P_8$, remains at 99, all the other node levels have been set. In the second cycle of the procedure, the node level of the node $N_6$ is set to 4 as shown in FIG. 17A, and the resistance RES(8) of the pipe $P_8$ is returned to positive as shown in FIG. 17B, at step 510. In addition, the switch SW is changed to 1.

Since the switch SW=1 when the second cycle has been completed, the processing enters into the third cycle. In the third cycle, the processing never passes through step 510. As a result, the switch SW is maintained at 0, and hence the procedure is completed at step 514.

After the node levels have been determined, the elementary circuits C(k) are determined in stage 600 as shown in FIGS. 6A–6E.

In stage 600, upstream nodes are sequentially traced from a first node and a second node at the ends of the circuit origin pipe $P_k$ until the routes starting from the first node and the second node reach the different source nodes, or the same upstream node including the same source node. The route starting from the first node at one end of the circuit origin pipe $P_k$ is called an A route, and the route starting from the second node at the other end of the circuit origin pipe $P_k$ is called a B route as shown in FIGS. 6C and 6D. Both A and B routes trace upstream nodes until they reach the same node whose node level is higher than those of the starting nodes, or the different source nodes.

Figure 18:
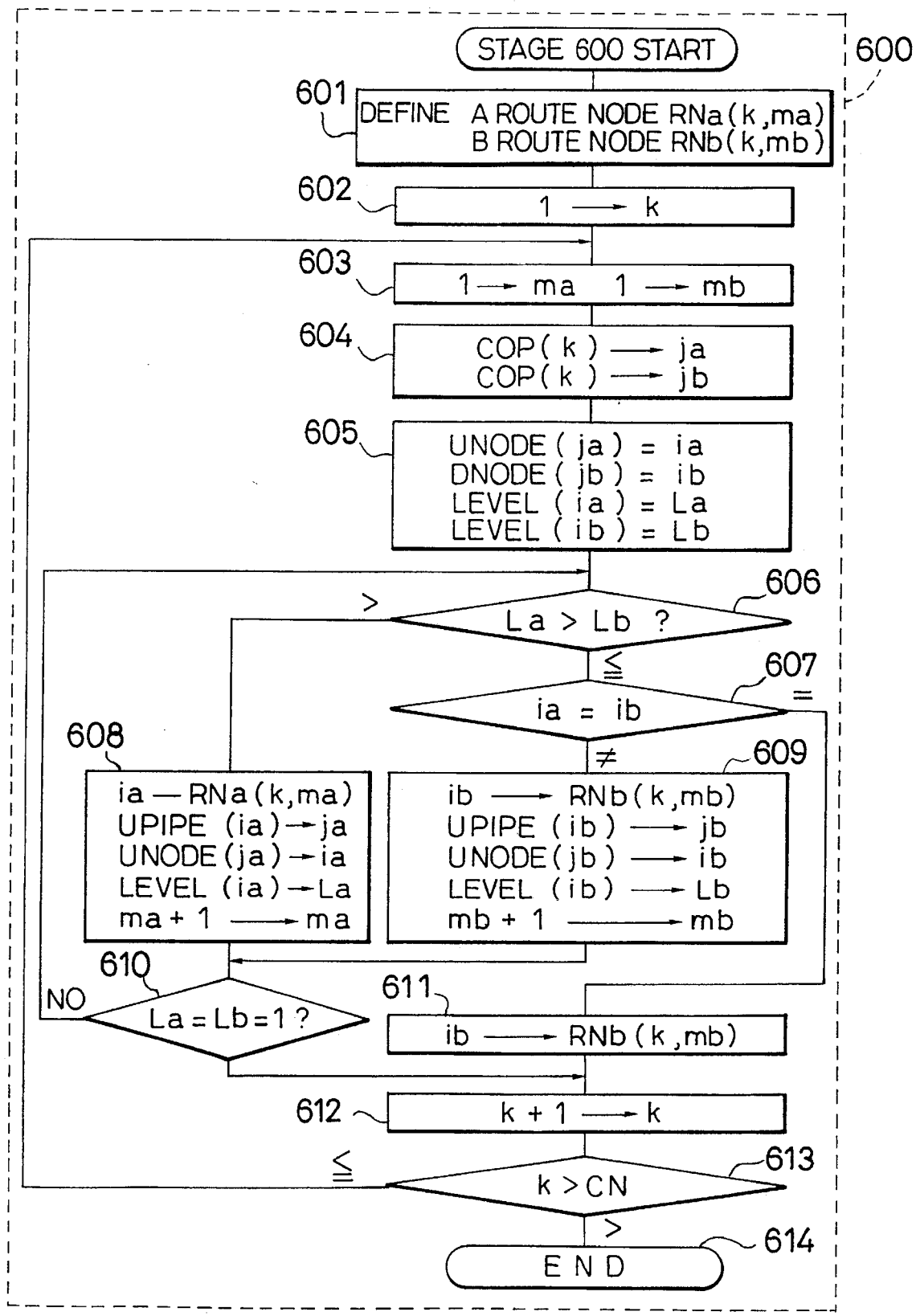
FIG. 18 is a flowchart illustrating the procedure of stage 600 for determining elementary circuits of the pipeline network.

FIG. 18 is a flowchart showing the process of stage 600 executed by the CPU 20.

At step 601, a memory area RNa(k, $m_a$) for storing the nodes associated with the A route, and a memory area RNb(k, $m_b$) for storing the nodes associated with the B route are defined. At step 602, a parameter k is set to its initial value 1 so that the circuit origin pipes are processed in ascending order from 1 to LN (=5 in this embodiment, see FIG. 14C).

At step 603, parameters $m_a$ and $m_b$ for specifying the memory addresses in the memory areas RNa(k, $m_a$) and RNb(k, $m_b$) are initially set to 1. At step 604, circuit origin pipe $P_k$ whose pipe number is COP(k) is selected, and its pipe number COP(k) is substituted into parameters $j_a$ and $j_b$. For example, when k=1, the pipe $P_2$ is selected from the data table 120 shown in FIG. 14C, and hence $j_a=j_b=2$.

At step 605, the first node $N_{ia}$ and the second node $N_{ib}$ of the circuit origin pipe $P_{ja}$ and $P_{jb}$ (ja=jb) are determined. In addition, the node levels $L_a$ and $L_b$ of the first and second nodes $N_{ia}$ and $N_{ib}$ are read from the data table 100 shown in FIG. 17A.

After this, the route A and the route B are separately traced upstream from step 606 to step 610.

At step 606, the node level $L_a$ of the node $N_{ia}$ of the A route and the node level $L_b$ of the node $N_{ib}$ of the B route is compared. If the node level $L_a$ is greater than the node level $L_b$, that is, if $L_a>L_b$, the route A is traced upstream at step 608, whereas if $L_a \leq L_b$, the route B is traced upstream at step 609. Before that, at step 607, the node number $i_a$ of the A route and the node number $i_b$ of the B route are compared. If they are equal, that is, if both A route and B route reach the same node, the processing jumps to step 611 so that the process on the current circuit origin pipe $P_k$ is completed. Otherwise, the processing proceeds to step 609.

At step 608, the upstream node next to the node $N_{ia}$ and its node level are determined. To accomplish this, the upstream pipe number UPIPE($i_a$) is obtained after storing the node number $i_a$ into the memory area RNa(k, $m_a$), and is substituted into $j_a$. Then, the upstream node number UNODE($j_a$) of the upstream pipe $P_{ja}$ is determined, and is substituted into $i_a$. In addition, the level of the node $N_{ia}$ is obtained, and $m_a$ is incremented.

At step 609, a procedure similar to that of step 608 is executed with regard to the node of the B route. Thus, the next upstream node is traced for the A route or for the B route.

At step 610, the node level $L_a$ of the node $N_{ia}$ and the node level $L_b$ of the node $N_{ib}$ are tested whether they are 1. If both of them are 1, that is, if both A route and B route reach one of the source nodes, the process for the current circuit origin pipe $P_k$ is completed, and hence k is incremented at step 612. Otherwise, the processing returns to step 606 so as to trace upstream again.

In this way, the upstream nodes are traced along the A route and the B route alternately until the two routes reach the same node (including the source node) or the different source nodes. With regard to the elementary circuits shown in FIGS. 6A and 6C, the last nodes are the source nodes $N_1$ and $N_4$, and for the elementary circuits in FIGS. 6B and 6E, the last node is one of the source nodes. With regard to the elementary circuit shown in FIG. 6D, the last node is node $N_8$ because the elementary circuit is completed at that node.

The procedure from step 606 to step 613 is repeated until all the circuit origin pipes $P_k$ are processed, that is, until k exceeds the total number LN of the circuit origin pipes at step 613.

After all the elementary circuits shown in FIGS. 6A–6E are obtained, an initial flow of each pipe of the network is determined in stage 700.

Figure 19:
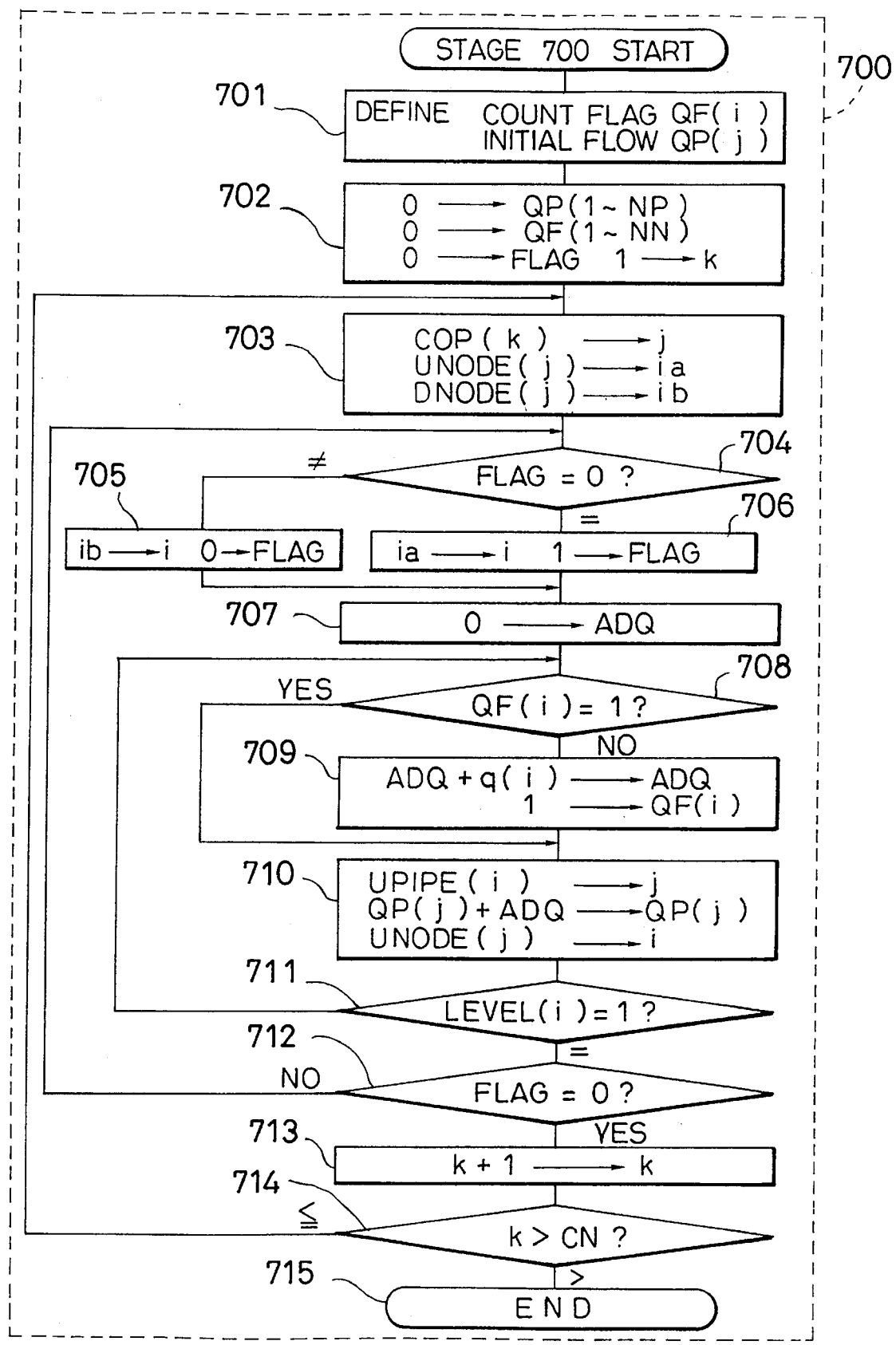
FIG. 19 is a flowchart illustrating the procedure of stage 700 for setting initial values of flows of the pipeline network.

FIG. 19 is a flowchart showing the process of the stage 700 executed by the CPU 20.

At step 701, an area for each counted flag QF(i) is defined which indicates that the demand quantity q(i) of the node $N_i$ has already been counted. In addition, an area for an initial value QP(j) of the flow of each pipe $P_j$ is also defined. At step 702, the initial values QP(j), the flags QF(i), and a flag FLAG are initialized to 0, and a parameter k is set to 1. Here, FLAG indicates whether the procedure from step 704 to step 714 is executed with regard to the route A (FLAG=0) or with regard to the route B (FLAG=1). The procedure is executed on the route A first, and then on the route B. The flag FLAG is used to switch the routes.

At step 703, the circuit origin pipe COP(k) is selected, and its upstream node number ia and downstream node number $i_b$ are determined. After that, the initial flow of each pipe $P_j$ is determined along the route A, and then along the route B.

At step 704, FLAG is tested whether it is 0 or not. If it is 0, the process on the route A is started after the node number $i_a$ is substituted into i and FLAG is set to 1 at step 706. On the other hand, if FLAG is 1, the process on the route B is started after the node number $i_b$ is substituted into i and FLAG is set to 0 at step 705.

At step 707, a sum quantity ADQ is initialized to 0. At step 708, the flag QF(i) is tested if it is 1, which indicates that the demand quantity of the node $N_i$ has been already added. If the flag QF(i) is 1, the processing jumps to step 710, whereas if it is 0, the processing proceeds to the next step 709. At step 709, the demand quantity q(i) of the node $N_i$ is added to the sum quantity ADQ, and the flag QF(i) is turned to 1 which indicates that the addition of the demand quantity of the node $N_i$ has been completed.

At step 710, the upstream pipe number UPIPE(i)=j of the node $N_i$ is obtained, and the flow QP(j) of the pipe $P_j$ is added to the sum quantity ADQ. Further, the upstream node number UNODE(j) of the pipe $P_j$ is set as the new node number i. Thus, the upstream node next to the current node $N_i$ is set as the new node to be processed.

At step 711, the node level of the node $N_i$ is tested if it is 1. If it is greater than 1, the processing returns to step 708 to handle the upstream node and pipe. If it is 1, that is, if the node $N_i$ is the source node, FLAG is tested if it is 0. If FLAG is 1, the processing returns to step 704 to start the second cycle of the procedure from step 704 to step 712 to perform processing on the route B. If FLAG=0, k is incremented to k+1 at step 713 so that the next circuit origin pipe COP(k) is processed. Thus, the procedure is repeated until all the circuit origin pipes are processed, which is confirmed at step 714 by testing if k exceeds CN.

For example, for the circuit origin pipe $P_{10}$ as shown in FIG. 7, the node $N_{10}$ is selected as its upstream node, and its demand quantity q(10) is added to ADQ which is 0. Subsequently, the upstream pipe $P_{11}$ is selected and its flow QP(11) is determined by QP+ADQ=q(10) in this case. Then, the upstream node $N_8$ is selected, and its demand quality q(8) is added to ADQ=q(10), resulting in q(10)+q(8). After this, the upstream pipe $P_6$ is selected, and its flow QP(6) is set at QP+ADQ=q(10)+q(8). Finally, the upstream node $N_4$ of the pipe $P_6$ is selected.

Likewise, in the second cycle of the procedure, the demand quantity q(6) of the node $N_6$, the demand quantity q(7) of the node $N_7$, and the quantity q(10) and q(8) are added successively. Thus, the initial flows as shown in FIG. 7 are obtained. In this case, the demand quantity of each node is counted only once because the counted flag QF(i) is set to 1 once it is added to ADQ at step 709.

According to the present embodiment, the elementary circuits necessary for computing the flows of a pipeline network, which includes any number of source nodes, demanding nodes and pipes, can be automatically carried out. Therefore, it can achieve labor saving.

In addition, since the present embodiment sets initial flows of the network automatically, it can achieve time saving. In setting the initial values, which are essential for computing the flows of the pipeline network and have great influence on computing time, the flow of a pipe which seems to have the least flow in each elementary circuit is set to 0, so that the elementary circuit will have a tree structure.

In the present invention, changes and modifications may be made without departing from the scope of the invention. For example, the data in stage 100 can be prepared by processing and editing digital mapping data. If the total number of the nodes is not more than 50 or so, the data can be prepared manually. Furthermore, stage 600 may be incorporated into stage 800 so that the flows through the circuit origin pipes can be set by the Hardy Cross method while finding elementary circuit by using the procedure as defined in stage 600.

Moreover, the present invention can be applied to the computation of a network of water pipes, of gas pipelines, and of an electric wires. For computing the currents of an electric network, pipes are replaced with wires and flows are replaced with currents.

The present invention has been described in detail with respect to an embodiment, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A computer program product for use with a system for analyzing flows in a pipe network including one or more source nodes and a plurality of demanding nodes, said one or more source nodes and said plurality of demanding nodes being interconnected with pipes, and each of said pipes having a known resistance, said computer program product comprising:

(a) first computer readable program code means for causing a computer to determine a resistance of a passage from each of said one or more source nodes to each one of said plurality of demanding nodes by summing the resistance of each of said pipes constituting the passage;

(b) second computer readable program code means for causing said computer to determine for each of said plurality of demanding nodes, a source and a total resistance on the basis of the resistance of the passage, said total resistance being determined as the minimum resistance of the passages from the demanding node to the source nodes, and said source node being determined as a source node joined to the demanding node through the passage providing the total resistance;

(c) third computer readable program code means for causing said computer to determine for each of said pipes, an upstream node and a downstream node on the basis of the total resistances, said upstream node having less total resistance than said downstream node;

(d) fourth computer readable program code means for causing said computer to designate a pipe joining one of said upstream nodes to one of said downstream nodes as an upstream pipe of that downstream node;

(e) fifth computer readable program code means for causing said computer to select a pipe, which is never designated as an upstream pipe, as a circuit origin pipe;

(f) sixth computer readable program code means for causing said computer to determine for each of said one or more source nodes and said plurality of demanding nodes, a node level on the basis of said upstream nodes and said downstream nodes by ignoring the circuit origin pipes of said pipeline network, said node level indicating the number of nodes included in the passage from the source node;

(g) seventh computer readable program code means for causing said computer to determine elementary circuits, by tracing upstream nodes along a first route starting from a first node of one of said circuit origin pipes and along a second route starting from a second node of the circuit origin pipe in accordance with the node level of the upstream node of each pipe, until the first and second routes reach a same source node or different source nodes, or a same demanding node, each of said elementary circuits being used as an element for determining a flow of each of said pipes; and (h) a storing medium usable by said computer and storing said first to seventh computer readable program code means.

2. The computer program product of claim 1, further comprising:

(i) eighth computer readable program code means for causing said computer to divide said network into one or more tree structures by assuming flows of predetermined pipes as 0; and (j) ninth computer readable program code means for causing said computer to determine an initial flow of each pipe of said pipeline network, by tracing upstream nodes along a first route starting from a first node of one of said predetermined pipes and along a second route starting from a second node of the predetermined pipe until the first and second routes reach the same source node, or different source nodes, or the same demanding node, and by adding demand quantity of each node along said routes; and wherein said storing medium stores said eighth and ninth computer readable program code means.

3. A computer program product for use with a system for analyzing flows in a pipe network including one or more source nodes and a plurality of demanding nodes, said one or more source nodes and said plurality of demanding nodes being interconnected with pipes, and each of said pipes having a known resistance, said computer program product comprising:

(a) first computer readable program code means for causing a computer to determine a resistance of a passage from each of said one or more source nodes to each one of said plurality of demanding nodes by summing of the resistance of each of said pipes constituting the passage;

(b) second computer readable program code means for causing said computer to determine for each of said plurality of demanding nodes, a source node and a total resistance on the basis of the resistance of the passages, said total resistance being determined as the minimum resistance of the passages from the demanding node to the source nodes, and said source node being determined as a source node joined to the demanding node through the passage providing the total resistance;

(c) third computer readable program code means for causing said computer to determine for each of said pipes, an upstream node and a downstream node on the basis of the total resistances, said upstream node having less total resistance than said downstream node;

(d) fourth computer readable program code means for causing said computer to designate a pipe joining one of said upstream nodes to one of said downstream nodes as an upstream pipe of that downstream node;

(e) fifth computer readable program code means for causing said computer to divide said network into one or more tree structures by assuming flows of predetermined pipes as 0;

(f) sixth computer readable program code means for causing said computer to determine an initial flow of each pipe of said pipeline network, by tracing upstream nodes along a first route starting from a first node of one of said predetermined pipes and along a second route starting from a second node of the predetermined pipe until the first and second routes reach the same source node, or different source nodes, or the same demanding node, and by adding demand quantity of each node along said routes; and (g) a storing medium usable by said computer and storing said first to sixth computer readable program code means.

* * * * *